United States Patent Office.

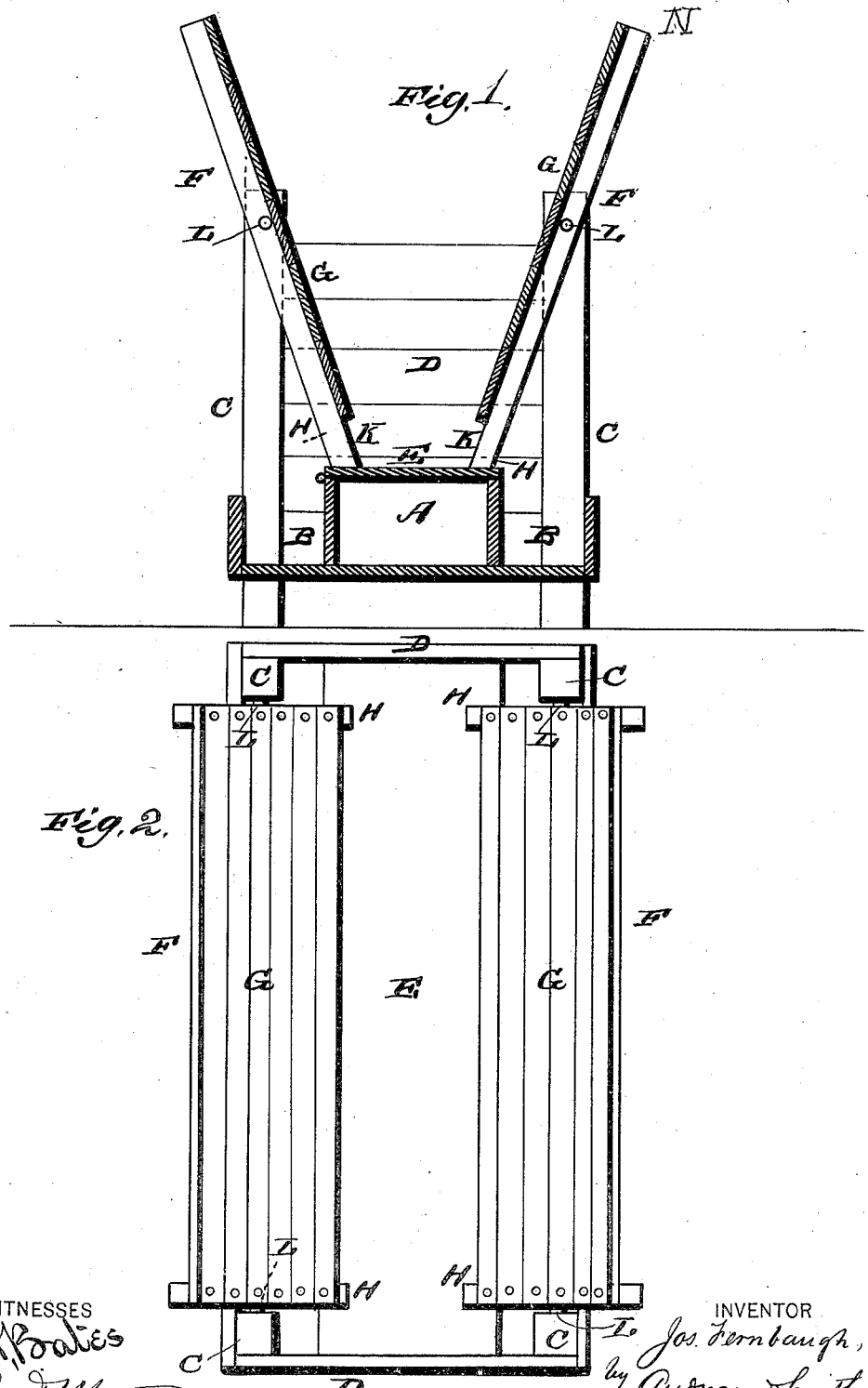

JOSEPH FERNBAUGH, OF UPPER SANDUSKY, OHIO.

FEED-RACK.

SPECIFICATION forming part of Letters Patent No. 307,637, dated November 4, 1884.

Application filed March 31, 1884. (No model.)

*To all whom it may concern:*

Be it known that I, JOSEPH FERNBAUGH, a citizen of the United States, residing at Upper Sandusky, in the county of Wyandot and State of Ohio, have invented certain new and useful Improvements in Sheep-Racks; and I do declare the following to be a full, clear, and exact description of the invention, such as will enable others skilled in the art to which it appertains to make and use the same, reference being had to the accompanying drawings, and to letters or figures of reference marked thereon, which form a part of this specification.

Figure 1 of the drawings is a vertical sectional view of my rack, and Fig. 2 is a plan view of the same.

This invention has relation to improvements in sheep-feeding racks; and it consists in the construction and novel arrangement of devices, as will be hereinafter more fully set forth, and particularly pointed out in the claim appended.

A rack of this kind may be made single or double; but the double form illustrated in the drawings is by far the most economical.

The letter A designates a central grain-storage box extending longitudinally of the frame, and on each side of it is constructed a long grain-trough, B, which is contiguous to the box, the side of the box usually forming the back wall of the trough.

E is the lid of the grain-box.

The corner-posts C of the frame are extended upward, as shown, and are strongly braced by the bars D.

F F represent the swinging rack-frames, which are of large size and are boarded closely over the upper portions, as shown at G, the ends of the frame-bars extending below the boards, as at H, to provide openings K, whereby access is had to the feed. These rack-frames are connected to uprights C by strong journal-pins L in such a manner that they may be swung around upon a horizontal axis. The distance from the axis to the ends of the projections H of each frame F is greater than the distance from said axis to the other edge, N, of the frame. That part of each frame below the axis is designed to be the heaviest, so that it will maintain its position under some pressure. When the rack-frames are turned inward upon their journal-pins, their projecting arms H will rest on the top of the central grain-box, and they will form a rack to hold long feed, which can be easily reached by the sheep through the openings K over the grain-box. Leaves and small seed from this rack will not be wasted, as they will fall into the side troughs which extend below the rack-frames. When the rack-frames are turned outward, they rest against the outer portion of the framing and form guard-walls which serve to keep the sheep from interfering with the attendant when he is distributing the grain from the central reservoir or grain-box to the side grain-troughs. It will also be perceived that the swinging rack-frames, by their engagement with the cover of the grain-storage box, will prevent the sheep, while feeding, from raising the said cover and getting to the grain therein.

Having described this invention, what I claim, and desire to secure by Letters Patent, is—

As an improvement in sheep-racks in which the rack-walls are convertible to guard-walls and the frame is provided with lateral troughs, the combination therewith of the central longitudinal grain-box and the vertically-swinging rack-frames adapted to engage the cover of the said box by their lower ends and prevent the same from being raised while the sheep are feeding, substantially as shown and described.

In testimony whereof I affix my signature in presence of two witnesses.

JOSEPH FERNBAUGH.

Witnesses:
GEO. B. STEVENSON,
W. G. DUMM.